(12) United States Patent
Park

(10) Patent No.: US 11,374,495 B2
(45) Date of Patent: Jun. 28, 2022

(54) RENEWABLE ENERGY POWER CONTROL DEVICE INCLUDING BOOST CONVERTER AND CONTROL UNIT

(71) Applicant: TECHBRIDGE CO., LTD., Chungcheongbuk-do (KR)

(72) Inventor: Jungyong Park, Chungcheongbuk-do (KR)

(73) Assignee: TECHBRIDGE CO., LTD., Chungcheongbuk-Do (KR)

( * ) Notice: Subject to any disclaimer, the term of this patent is extended or adjusted under 35 U.S.C. 154(b) by 66 days.

(21) Appl. No.: 17/040,354

(22) PCT Filed: Sep. 23, 2019

(86) PCT No.: PCT/KR2019/012345
§ 371 (c)(1),
(2) Date: Sep. 22, 2020

(87) PCT Pub. No.: WO2020/080688
PCT Pub. Date: Apr. 23, 2020

(65) Prior Publication Data
US 2021/0091666 A1    Mar. 25, 2021

(30) Foreign Application Priority Data

Oct. 15, 2018 (KR) .................. 10-2018-0122409

(51) Int. Cl.
*H02M 3/158* (2006.01)
*H02J 7/35* (2006.01)
(Continued)

(52) U.S. Cl.
CPC ............. *H02M 3/158* (2013.01); *H02J 7/35* (2013.01); *H02M 1/08* (2013.01); *H02J 3/381* (2013.01)

(58) Field of Classification Search
CPC ...... H02M 3/158; H02M 3/157; H02M 3/155; H02M 1/08; H02J 7/35; H02J 3/381; H03K 7/08
See application file for complete search history.

(56) References Cited

U.S. PATENT DOCUMENTS

2008/0290252 A1    11/2008  Leonhardt et al.
2017/0192445 A1*    7/2017  Dennis .................... H02J 3/381
2021/0151988 A1*    5/2021  Milivojevic ............ H02J 3/381

FOREIGN PATENT DOCUMENTS

JP    2002-171689 A    6/2002
JP    2011-188601 A    9/2011
(Continued)

OTHER PUBLICATIONS

International Search Report for PCT/KR2019/012345 dated Jan. 21, 2020.

*Primary Examiner* — Kyle J Moody
*Assistant Examiner* — Jye-June Lee
(74) *Attorney, Agent, or Firm* — The PL Law Group, PLLC

(57) ABSTRACT

A renewable energy power control device may include a boost converter that receives and boosts up an input source and supplies the boosted input source to an output stage, and a control unit that controls, by using a sampling voltage of the output stage, such that the output stage does not fall below a reference voltage, and, by using a sampling voltage of the input source, such that optimal power is supplied to a charging module or additional module connected to the input source. Therefore, the charging module or additional module can use the power supply of the input source, the output stage is driven without falling below the reference voltage, the charging module or additional module is also driven, and renewable energy can be used by controlling a boost converter such that an output stage is within a refer- (Continued)

ence voltage range and other modules can use the input source.

5 Claims, 8 Drawing Sheets

(51) Int. Cl.
  *H02M 1/08* (2006.01)
  *H02J 3/38* (2006.01)

(56) References Cited

FOREIGN PATENT DOCUMENTS

| JP | 2014-203433 A | 10/2014 |
| KR | 10-2000-0014436 A | 3/2000 |
| KR | 10-2007-0050044 A | 5/2007 |
| WO | 2009-120695 A1 | 10/2009 |
| WO | 2012-109426 A2 | 8/2012 |

* cited by examiner

421

RENEWABLE ENERGY POWER CONTROL DEVICE INCLUDING BOOST CONVERTER AND CONTROL UNIT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/012345, filed Sep. 23, 2019, which claims priority to the benefit of Korean Patent Application No. 10-2018-0122409 filed in the Korean Intellectual Property Office on Oct. 15, 2018, the entire contents of which are incorporated herein by reference.

TECHNICAL FIELD

The present disclosure relates to a renewable energy power control device, and more particularly, to a renewable energy power control device using renewable energy power.

BACKGROUND

Like Korean Publication No. 10-2000-0014436 (device and method for improving the efficiency of a boost-type charging system), Korean Patent No. 10-1302541 (power extractor circuit), and Korean Publication No. 10-2015-0091419 (power converter system that operates efficiently over a range of load conditions), a renewable energy power control device includes: a boost converter that receives and boosts up an input source, and then, supplies the boosted input source to an output stage; and a control unit for controlling, by using the sampling voltage of the output stage, such that the output stage does not fall below the reference voltage. The control unit controls the boost converter in such a way that the output stage does not fall below the reference voltage. The control unit controls the boost converter to boost up the input source and supply the boosted input source to the output stage.

However, since conventional renewable energy power control devices control the boost converter in such a way that the output stage does not fall below the reference voltage, the input source is not supplied to other modules. The input source is used to drive only the load that is the output stage, and cannot be used in other modules. Accordingly, the power remaining after the input source drives the load, is wasted.

SUMMARY

An objective of the present disclosure for addressing the above problems is to provide a renewable energy power control device for controlling such that an output stage does not fall below a reference voltage and optimal power is supplied to a charging module or an additional module connected to an input source.

In addition, the objective of the present disclosure is to provide a renewable energy power control device that performs a PWM control on a boost converter based on the power graph of the output stage according to the flow of the input source.

In addition, the objective of the present disclosure is to provide a renewable energy power control device that multiplexes the output up/down signal and the input up/down signal in a power graph, and selectively outputs, as a PWM muxing signal, a logical product of a result, obtained by comparing a reference voltage with an output sampling voltage, and a maximum value, to the boost converter.

In addition, the objective of the present disclosure is to provide a renewable energy power control device that, when the logical product of the comparison result and the maximum value is negative, the output up/down signal is output as a PWM muxing signal, and when the logical product of the comparison result and the maximum value is positive, the input up/down signal is output as a PWM muxing signal.

To achieve the objective, a renewable energy power control device according to the present disclosure may include: a boost converter 300 which inputs and boosts up an input source 100 and supplies the boosted input source to an output stage 200; and a control unit 400 which controls, by using a sampling voltage of an output stage 200, such that the output stage 200 does not fall below a reference voltage, and which controls, by using a sampling voltage of an input source 100, such that a charging module or additional module connected to the input source 100 is provided with an optimal power.

The control unit 400 may perform a PWM control on a boost converter 300 based on a power graph of the output stage 200 according to the flow of the input source 100 in such a way that optimal power is supplied to the charging module or additional module connected to the input source 100 while maintaining the output stage 200 to a level equal to or greater than a reference voltage.

The control unit 400 may include: an output unit 410 which outputs, as a sampling voltage of the output stage 200, the maximum value and an output up/down signal in the power graph, and, as a sampling voltage of the input source 100, an input up/down signal in the power graph; and a mux 420 which multiplexes the output up/down signal and the input up/down signal and selectively outputs, as a PWM muxing signal, a logical product of a result, obtained by comparing a reference voltage with an output sampling voltage, and a maximum value, to the boost converter 300.

The control unit 400 may include: an output sampling unit 411 for sampling the output stage 200; an output up/down signal unit 413 for outputting, as an output up/down signal, a sampling voltage of the output stage 200; a shift unit 412 for shift-calculating the output up/down signal and outputting a maximum value; an input sampling unit 414 for sampling the input source 100; an input up/down signal unit 415 for outputting, as an input up/down signal, a sampling voltage of the input source 100; and the mux 420 which multiplexes the output up/down signal and the input up/down signal and selectively outputs, as a PWM muxing signal, a logical product of a result, obtained by comparing a reference voltage with an output sampling voltage, and a maximum value to the boost converter 300.

When the logical product of the comparison result and the maximum value is negative, the mux 420 may output, as the PWM muxing signal, the output up/down signal, and when the logical product of the comparison result and the maximum value is positive, the mux 420 may output, as the PWM muxing signal, the input up/down signal.

Also, a method of controlling renewable energy power according to the present disclosure includes: receiving and boosting up an input of the input source 100 and supplying the boosted input source to the output stage 200, by the boost converter 300; controlling, by the control unit 400, such that the output stage 200 does not fall below a reference voltage, by using a sampling voltage of the output stage 200, and controlling, by the control unit 400, such that optimal power is supplied to a charging module or additional module connected to the input source 100 by using a sampling voltage of the input source 100.

The present disclosure further includes performing, by the control unit 400, a PWM control on the boost converter 300 based on a power graph of the output stage 200 according to the flow of the input source 100.

The controlling, performed by the control unit 400, may include: outputting, as a sampling voltage of the output stage 200, a maximum value and an output up/down signal in the power graph, and, as a sampling voltage of the input source 100, an input up/down signal in the power graph; and multiplexing the output up/down signal and the input up/down signal and selectively outputting, as a PWM muxing signal, a logical product of a result, obtained by comparing a reference voltage with an output sampling voltage, and a maximum value, to the boost converter 300.

In the case in which the renewable energy power control device according to the present disclosure as described above is used, a charging module or a load connected to the input source may use the power supply of the input source.

In addition, the output stage may be driven without falling below the reference voltage, and the charging module or additional module connected to the input source may also be driven.

In addition, renewable energy can be used by controlling a boost converter such that the output stage moves within the reference voltage range and other modules use the input source.

In addition, the power supply can be controlled by using a low-specification hardware configuration without using a high-specification processor.

DETAILED DESCRIPTION

The terms used in the present application are only used to describe specific embodiments, and are not intended to limit the present disclosure. An expression used in the singular encompasses the expression of the plural, unless it has a clearly different meaning in the context. The terms "include" or "have" used herein are intended to designate the presence of features, numbers, steps, operations, components, parts, or combinations thereof described in the specification, and it does not preclude the possibility of the presence or addition of one or more other features or numbers, steps, operations, components, parts, or combinations thereof.

Unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning in the context of the related technology, and should not be interpreted as an ideal or excessively formal meaning unless explicitly defined in this application.

Hereinafter, preferred embodiments of the present disclosure will be described in detail with reference to the accompanying drawings.

A renewable energy power control device may control such that an output stage does not fall below the reference voltage and optimal power is provided to a charging module or load connected to the input source, and may perform a PWM control on a boost converter based on a power graph of the output stage according to the flow of the input source. Herein, the renewable energy power control device multiplexes the output up/down signal and the input up/down signal in the power graph and selectively outputs, as a PWM muxing signal, a logical product of a result, obtained by comparing a reference voltage with an output sampling voltage, and a maximum value, to the boost converter, and, when the logical product of the comparison result and the maximum value is negative, the output up/down signal is output as the PWM muxing signal, and when the logical product of the comparison result and the maximum value is positive, the input up/down signal is output as the PWM muxing signal.

Figure 1:
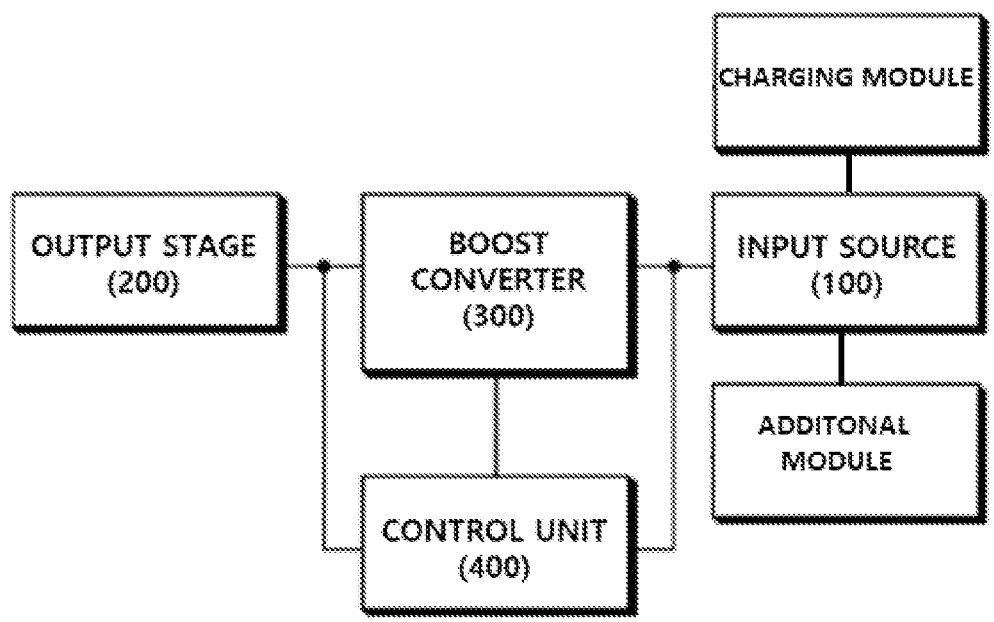
FIG. 1 shows a block diagram showing the configuration of a renewable energy power control device.

FIG. 1 shows a block diagram showing the configuration of a renewable energy power control device.

The renewable energy power control device may include: a boost converter 300 which inputs and boosts up an input source 100 and supplies the boosted input source to an output stage 200; and a control unit 400 which controls, by using a sampling voltage of the output stage 200, such that the output stage 200 does not fall below a reference voltage, and which controls, by using a sampling voltage of the input source 100, such that an optimal power is provided to a charging module or additional module connected to the input source 100. In this case, the additional module may be a load. The optimal power is the power that makes the input power a maximum while the voltage delivered to the load is equal to or greater than a reference voltage.

The control unit 400 controls the boost converter 300 to provide optimal power to the charging module or additional module connected to the input source 100 while maintaining the output stage 200 to a level equal to or greater than a reference voltage.

Figure 2:
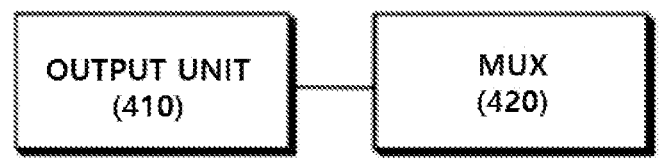
FIG. 2 shows a block diagram showing an example of the configuration of a control unit 400.

FIG. 2 shows a block diagram showing an example of the configuration of the control unit 400.

The control unit 400 may include: an output unit 410 which outputs, as a sampling voltage of the output stage 200, the maximum value and an output up/down signal in the power graph, and, as a sampling voltage of the input source 100, an input up/down signal in the power graph; and a mux 420 which multiplexes the output up/down signal and the input up/down signals and selectively outputs, as a PWM muxing signal, a logical product of a result, obtained by comparing a reference voltage with an output sampling voltage, and the maximum value, to the boost converter 300. Here, voltage may be sampled with respect to the input source 100 or the output stage 200. In one or more embodiments, current sampling is also possible. For example, in the case of solar light, one of renewable energy, since the input voltage is constantly output without significant fluctuations, the control unit 400 may estimate the fluctuation of the input power through current sampling.

Figure 3:
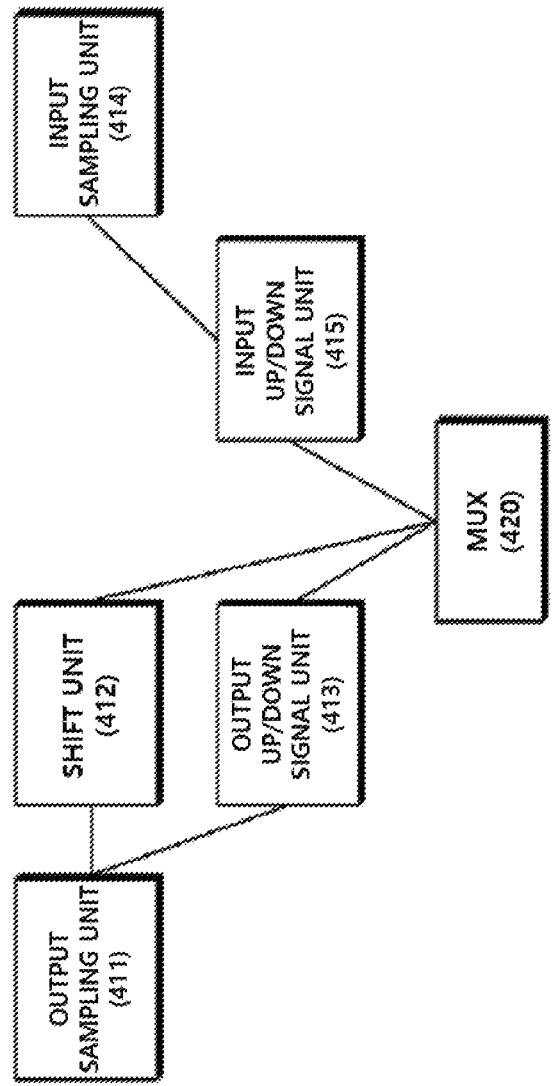
FIG. 3 shows a block diagram showing another example of the configuration of the control unit 400.

FIG. 3 shows a block diagram showing another example of the configuration of the control unit 400.

The control unit 400 may include: an output sampling unit 411 for sampling the output stage 200; an output up/down signal unit 413 for outputting, as an output up/down signal, a sampling voltage of the output stage 200; a shift unit 412 for shift-calculating the output up/down signal and outputting a maximum value; an input sampling unit 414 for sampling the input source 100; an input up/down signal unit 415 for outputting, as an input up/down signal, a sampling voltage of input source 100; and the mux 420 which multiplexes the output up/down signal and the input up/down signal and selectively outputs, as a PWM muxing signal, a logical product of a result, obtained by comparing a reference voltage with an output sampling voltage, and a maximum value, to the boost converter 300.

When the logical product of the comparison result and the maximum value is negative, the mux 420 may output, as the PWM muxing signal, the output up/down signal, and when the logical product of the comparison result and the maximum value is positive, the mux 420 may output, as the PWM muxing signal, the input up/down signal.

Figure 4:
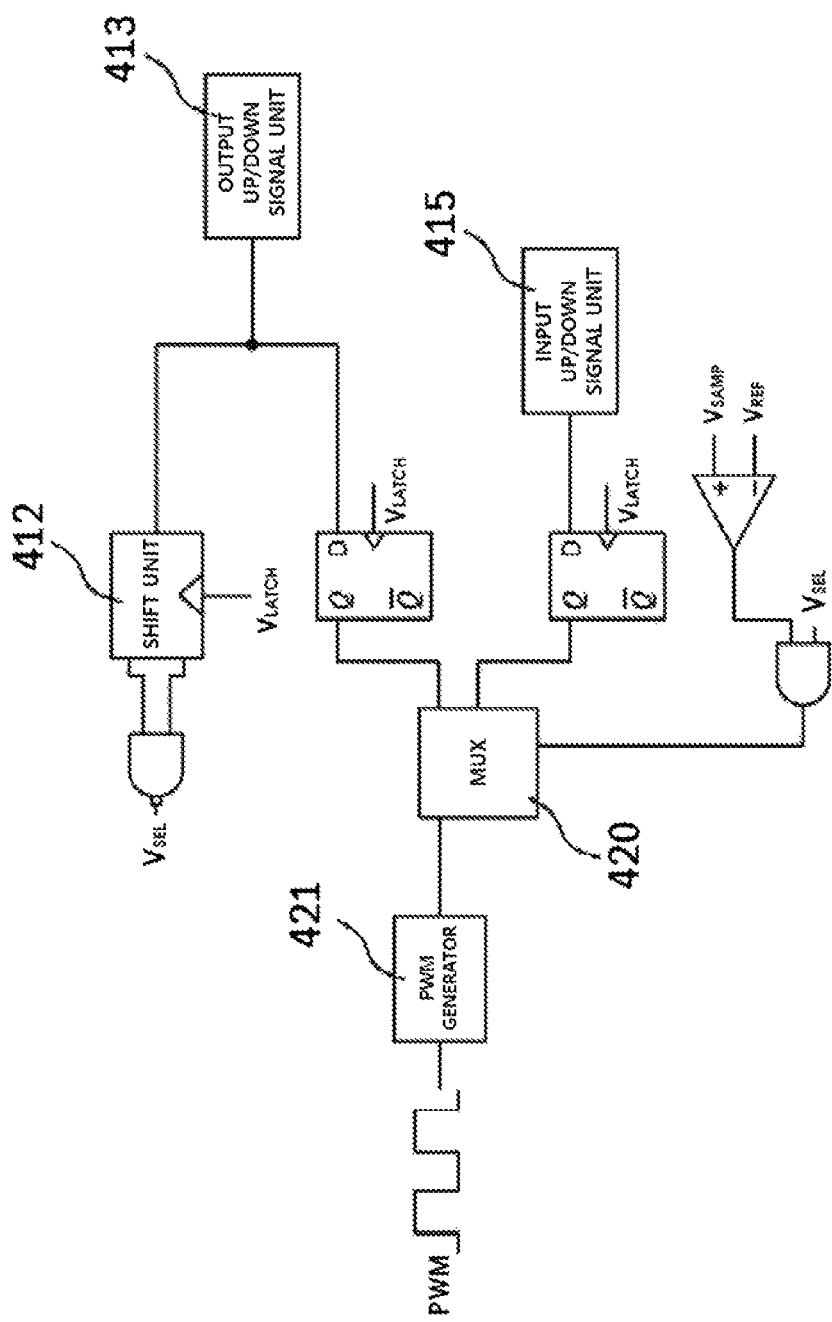
FIG. 4 shows a circuit diagram showing an embodiment of a renewable energy power control device.

FIG. 4 shows a circuit diagram showing an embodiment of a renewable energy power control device.

When the configuration of the renewable energy power control device is described according to the signal flow, the output up/down signal unit 413 may output, as an output up/down signal, the sampling voltage of the output stage 200.

The shift unit 412 shift-calculates the output up/down signal and outputs a maximum value. The shift-calculating may make the output up/down signal up or down. When the up or down operation is repeated, it may be determined that it is close to the maximum value. An NAND gate connected to the shift unit 412 outputs a maximum bit by NAND-calculating the output up/down signal consisting of two bits. For example, when the output up/down signal is 11, it is operated to widen the PWM duty. In this case, the NAND gate outputs 0 and thus there is no operation. When the output up/down signal is 10, 01, 00, the output of the NAND gate is input to a mux according to the level of the output sampling voltage, and thus, according to the output of input up/down signal, the PWM duty is adjusted, and thus, even when the voltage gain of a load is lowered, the power of the input source is increased.

Figure 9:
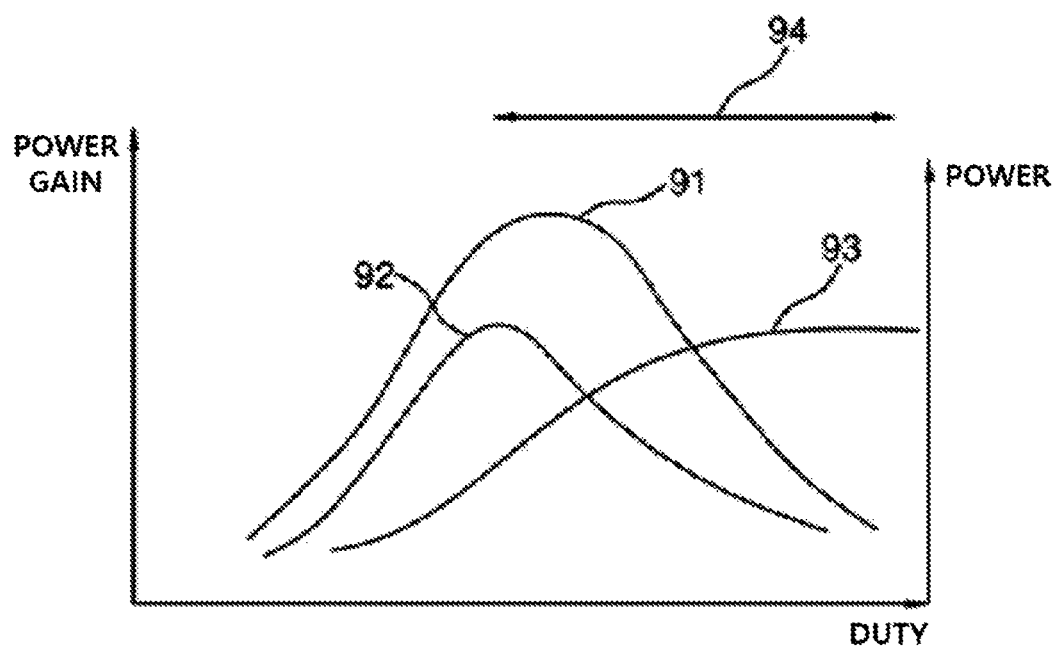
FIG. 9 shows a graph illustrating a control section.

FIG. 9 shows a graph for describing the control section, and has an ideal voltage gain curve 91 and an actual voltage gain curve 92 according to the PWM duty, and the input source power 93 gradually increases as the PWM duty increases. The section to the right of the maximum value of the actual voltage gain curve 92 corresponds to the control section 94, in which the input source power 93 increases even when the voltage gain decreases. A renewable energy power control device may be operated such that the input source power 93 outputs optimal power while the voltage of the load is maintained at a certain level or higher. A control signal for controlling the PWM duty in this control section 94 is generated by combining the output up/down signal unit 413, the shift unit 412, the input up/down signal unit 415, and the mux 420. The embodiment of FIG. 4 illustrates this combination.

The input up/down signal unit 415 outputs, as an input up/down signal, the sampling voltage of the input source 100.

The mux 420 multiplexes the output up/down signal and the input up/down signal, and selectively outputs, as a PWM muxing signal, a logical product of a result, obtained by comparing a reference voltage with an output sampling voltage, and a maximum value, to the boost converter 300.

The mux 420 multiplexes the output up/down signal and the input up/down signal, and selectively outputs, as a PWM muxing signal, a logical product of a result, obtained by comparing a reference voltage with an output sampling voltage, and a maximum value, to the boost converter 300.

When the logical product of the comparison result and the maximum value is negative, the mux 420 may output, as the PWM muxing signal, the output up/down signal, and when the logical product of the comparison result and the maximum value is positive, the mux 420 may output, as the PWM muxing signal, the input up/down signal.

A PWM generator 421 outputs the PWM signal to the boost converter 300 by ORing the PWM muxing signal to a clock.

Figure 5:
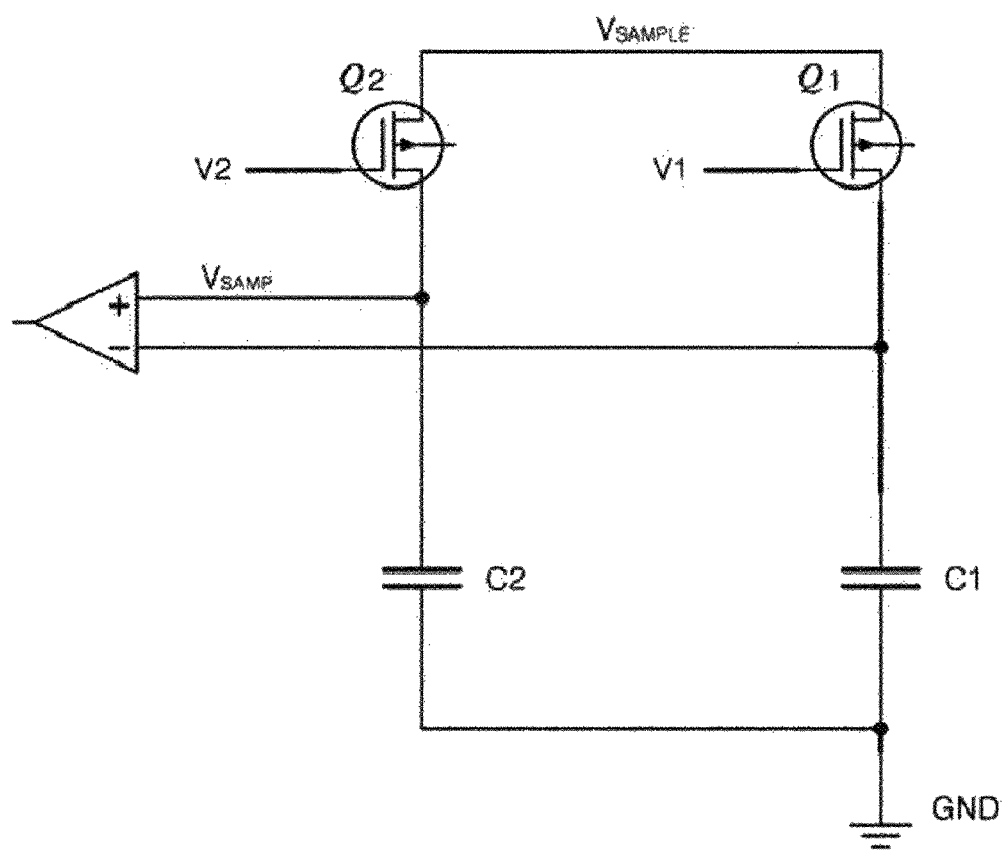
FIG. 5 shows an example of an output up/down signal unit 413.

FIG. 5 shows an example of an output up/down signal unit 413.

The output up/down signal unit 413 outputs, as an output up/down signal, the sampling voltage of the output stage 200. Output up/down signals are generated according to the rise or fall in the power graph of the output stage 200.

The output up/down signal unit 413 compares the sampling voltage of the output stage 200 at the previous time and at the next time through a comparator to generate an output up/down signal. The output up/down signal is input to the mux 420.

Figure 6:
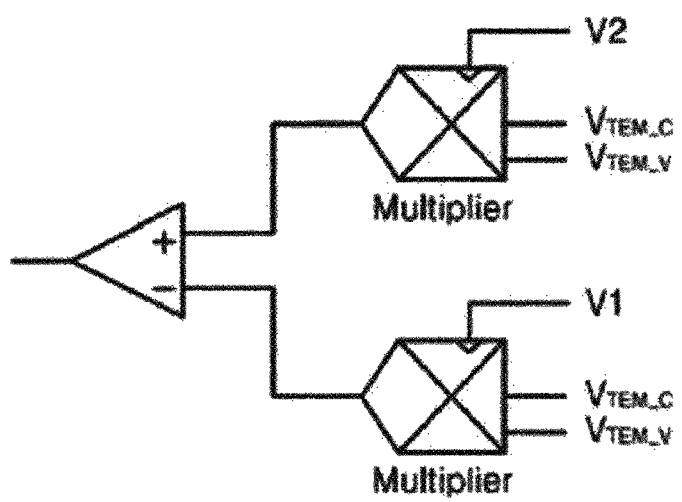
FIG. 6 shows an example of an input up/down signal unit 415.

FIG. 6 shows an example of the input up/down signal unit 415.

The input up/down signal unit 415 outputs, as an input up/down signal, the sampling voltage of the input source 100. Output up/down signals are generated according to the rise or fall in the power graph of the input source 100.

The input up/down signal unit 415 multiplies a previous sampling voltage Vtem_c before the input source 100 and a next sampling voltage Vtem_v after the input source 100 by a multiplier, and generates an input up/down signal through a comparator. The input up/down signal is input to the mux 420. Vtem_c is a voltage converted into a voltage by sensing an input current, and Vtem_v is an input voltage, that is, Vtem_c and Vtem-v are calculated as power through a multiplier, and input power is measured to create an input up/down signal.

Figure 7:
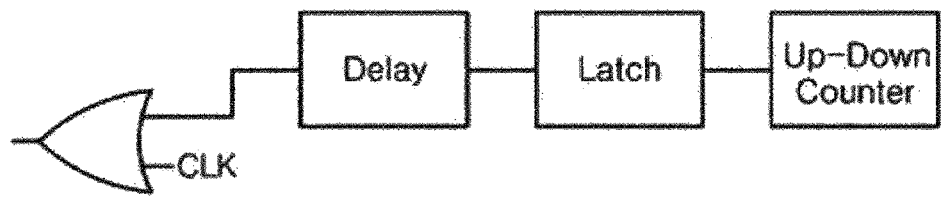
FIG. 7 shows an example diagram of a PWM generator.

FIG. 7 shows an example diagram of a PWM generator.

The PWM generator 421 outputs the PWM signal to the boost converter 300 by ORing the PWM muxing signal to the clock through up/down counters, latches, and delays. The PWM muxing signal goes through an up/down counter, is latched, and a delay is applied thereto, and then an OR operation is performed thereon with the clock to generate a PWM signal.

Figure 8:
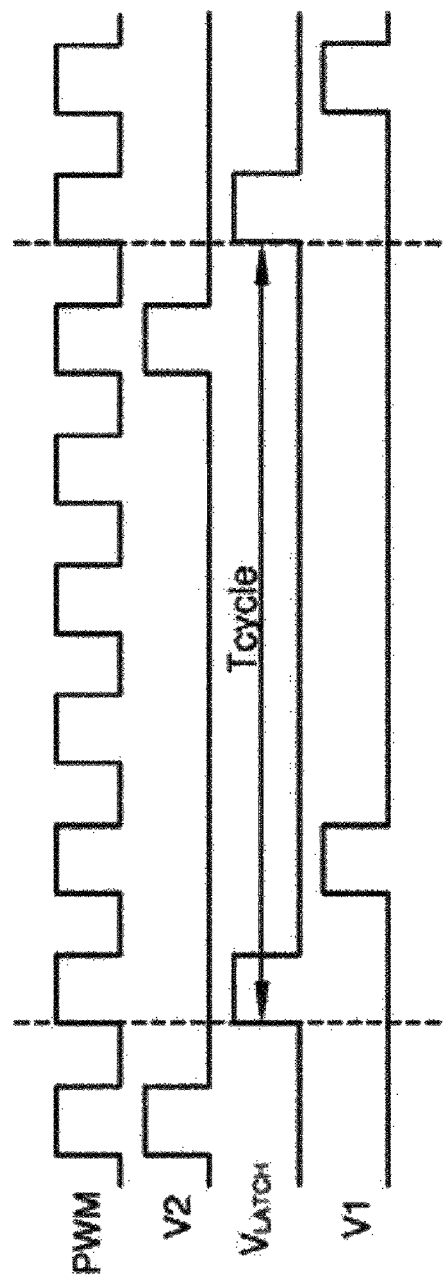
FIG. 8 shows an example diagram of a control waveform.

FIG. 8 shows an example diagram of a control waveform.

During the control cycle Tcycle, voltage sampling of V1 and V2 occurs, and a PWM signal is generated according to the up/down signal. The voltage sampling of V1 and V2 provides timing to generate up/down signals at the input source 100 or the output stage 200, and a PWM signal that controls the boost converter 300 is generated according to the selection of up/down signals by the mux 420.

Although embodiments of the present disclosure have been described, one of ordinary skilled in the art may variously modify and change this disclosure within the scope not departing from the spirit and scope of the disclosure described in the following claims.

What is claimed is:

1. A renewable energy power control device comprising:
   a boost converter that receives and boosts up an input source and supplies a boosted input source to an output stage; and a control unit that controls, by using a sampling voltage of the output stage, such that a voltage of the output stage does not fall below a reference voltage, and controls, by using a sampling voltage of the input source, such that power is supplied to a charging module or an additional module connected to the input source, wherein the control unit performs a pulse-width modulation (PWM) control on the boost converter based on a power graph of the output stage according to a flow of the input source in such a way that power is supplied to the charging module or the additional module connected to the input source while maintaining the voltage of the output stage to a level equal to or greater than the reference voltage;

the control unit comprises:

an output unit for outputting, as the sampling voltage of the output stage, a maximum value and an output up/down signal in a power graph, and outputting, as the sampling voltage of the input source, an input up/down signal from the power graph; and a mux for multiplexing the output up/down signal and the input up/down signal, and outputting, as a PWM muxing signal, a logical product of a comparison result, obtained by comparing the reference voltage with the sampling voltage of the output stage, and a maximum value of the output stage which is obtained by shift-calculating the output up/down signal, to the boost converter.

2. The renewable energy power control device of claim 1, wherein the control unit comprises:

an output sampling unit for sampling the output stage;

an output up/down signal unit for outputting, as an output up/down signal, the sampling voltage of the output stage;

a shift unit for outputting a maximum value of the output stage obtained by shift-calculating the output up/down signal;

an input sampling unit for sampling the input source;

an input up/down signal unit for outputting, as an input up/down signal, the sampling voltage of the input source; and a mux for multiplexing the output up/down signal and the input up/down signal, and outputting, as a PWM muxing signal, a logical product of a comparison result, obtained by comparing the reference voltage with the sampling voltage of the output stage, and the maximum value of the output stage which is obtained by shift-calculating the output up/down signal, to the boost converter.

3. The renewable energy power control device of claim 2, wherein, when the logical product of the comparison result and the maximum value of the output stage, obtained by shift-calculating the output up/down signal, is negative, the mux outputs, as the PWM muxing signal, the output up/down signal, and when the logical product of the comparison result and the maximum value of the output stage, obtained by shift-calculating the output up/down signal, is positive, the mux outputs, as the PWM muxing signal, the input up/down signal.

4. The renewable energy power control device of claim 1, wherein, when the logical product of the comparison result and the maximum value of the output stage, obtained by shift-calculating the output up/down signal, is negative, the mux outputs, as the PWM muxing signal, the output up/down signal, and when the logical product of the comparison result and the maximum value of the output stage, obtained by shift-calculating the output up/down signal, is positive, the mux outputs, as the PWM muxing signal, the input up/down signal.

5. A method of controlling renewable energy power, the method comprising:

receiving and boosting up an input of an input source and supplying a boosted input source to an output stage, by a boost converter;

controlling, by a control unit, such that a voltage of the output stage does not fall below a reference voltage, by using a sampling voltage of the output stage;

controlling, by the control unit, such that power is supplied to a charging module or an additional module connected to the input source by using a sampling voltage of the input source; and performing, by the control unit, a pulse-width modulation (PWM) control on the boost converter based on a power graph of the output stage according to a flow of the input source, wherein the performing of the PWM control comprises:

outputting, as the sampling voltage of the output stage, a maximum value of the output stage, obtained by shift-calculating an output up/down signal in a power graph, and the output up/down signal, and outputting, as the sampling voltage of the input source, an input up/down signal in the power graph, by the control unit; and multiplexing the output up/down signal and the input up/down signal, and outputting, as a PWM muxing signal, a logical product of a comparison result, obtained by comparing the reference voltage with the sampling voltage of the output stage, and the maximum value of the output stage which is obtained by shift-calculating the output up/down signal, to the boost converter.

* * * * *